March 27, 1934.    C. P. CHAMBERLIN    1,952,044
ORNAMENTAL BEAD FOR VEHICLE WHEEL HUBS
Filed Oct. 14, 1931
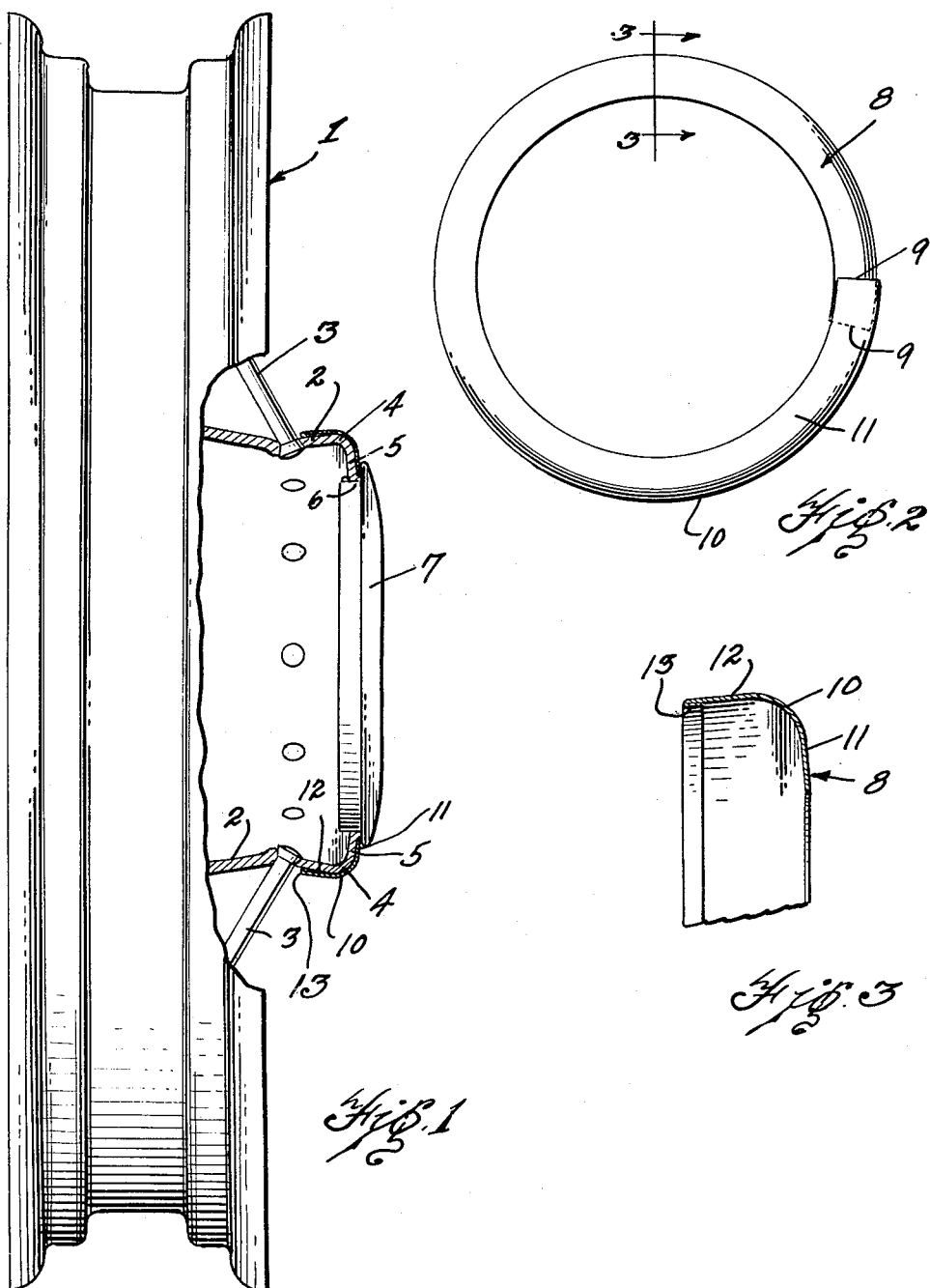
INVENTOR.
CLARENCE P. CHAMBERLIN
BY
ATTORNEY.

Patented Mar. 27, 1934

1,952,044

UNITED STATES PATENT OFFICE 1,952,044

ORNAMENTAL BEAD FOR VEHICLE WHEEL HUBS

Clarence P. Chamberlin, Highland Park, Mich.

Application October 14, 1931, Serial No. 568,793

5 Claims. (Cl. 41—10)

This invention relates to ornamental beads for vehicle wheel hubs. In manufacturing automobile wheels it is customary to have the hub projecting beyond the outer face of the tire casing and rim and, due to this fact, the nickel or chromium plate which is usually applied to the hubs is very quickly damaged by stones or gravel being driven thereagainst. It is an object therefore of this invention to provide a sheet metal head of stainless steel which will encircle the exposed portion of the hub and which will always provide a polished surface on the hub.

Another object of the invention is in the provision of a split bead or ring of sheet metal stainless steel which may be sprung over the periphery of an automobile wheel hub and which will maintain itself in position thereon by the inherent spring pressure exerted by the bead on the hub.

Another object of the invention is in the provision of an ornamental bead for wheel hubs which is so constructed as to accommodate variations in diameter, due to the inaccuracy in manufacture, of the hubs.

A still further object of the invention is in the provision of an ornamental bead which is extremely cheap to manufacture and which may be quickly placed in position upon an automobile wheel hub and which will present a polished surface at all times.

These objects and the several novel features of the invention are hereinafter more fully described and claimed, and the preferred form of construction by which these objects are attained is shown in the accompanying drawing in which—

Fig. 1 is a transverse sectional view through an automobile wheel, of the wire spoke type, embodying my invention.

Fig. 2 is a front elevational view of my improved bead.

Fig. 3 is an enlarged sectional view taken on line 3—3 of Fig. 2.

Referring to the drawing, it will be seen that the automobile wheel 1 which is of the wire spoke type and may be of any desired construction is provided with a hub 2 the same having the inner ends of the spokes 3 inserted therein and positioned fairly close to the outer face of the hub 2. The hub 2 is formed with the curved portion 4 and the inwardly extending flange 5 forming the aperture 6 in which the standard hub cap 7 is inserted and it will be seen that the outer diameter of the hub cap extends beyond the inner periphery of the aperture 6.

It will also be seen that the portion of the hub extending from the spokes 3 to the curved portion 4 is in the form of a truncated cone, and tapers inwardly toward the inner face of the wheel.

The ornamental bead 8 is preferably made of very thin sheet metal stainless steel which will maintain a polished surface although pitted or dented by stones and gravel driven thereagainst. By referring to Fig. 2 it will be seen that the bead 8 is split at 9 and one end overlaps the other end so that the bead may be sprung apart to accommodate varying diameters of hubs due to their inaccuracy in being manufactured.

It will be understood that the inner diameter of the bead is less than the outer diameter of the hub 2 so that the bead will be sprung apart to place the same over the hub and will maintain itself in place due to the inherent spring of the bead. The bead 8 comprises the round portion 10 and the inner extending flange portion 11 which lies flush against the inturned flange 5 of the hub 2 and the hub cap 7 is of sufficiently large diameter to extend past the inner diameter of the flange 11. It will be seen that the rounded portion 10 also closely encircles the rounded portion 4 of the hub 2. The portion 12 of the bead 8 is in the form of a truncated cone, and the smaller diameter of the same is provided with the return bent portion 13 which fits around the hub 2 in close proximity to the spokes 3.

It will be understood that the bead 8 will be maintained on the hub 2 by the circumferential inherent spring pressure exerted by the bead on the hub and since the portion 12 is in the form of a truncated cone which closely encircles the truncated portion of the hub that the bead will maintain itself in position on the hub without any screws or fastening means of any kind being necessary.

From the foregoing description it becomes evident that I have provided an ornamental bead for hub caps which is cheap to manufacture and which may be easily placed over the hub of an automobile wheel which will always present a polished surface, and which will maintain itself in position on the hub by the inherent spring pressure exerted by the bead on the hub.

Having thus fully described my invention, its utility and mode of operation, what I claim and desire to secure by Letters Patent of the United States is—

1. An ornamental bead for the hub of a spoked vehicle wheel having a truncated conical portion and an inturned flange providing an aperture to receive a flanged hub cap, comprising a split ring of spring sheet metal of non-corrosive character and having a cross sectional shape to closely encircle the outer end of the wheel hub and an inturned flange for engaging the said inturned flange of the wheel hub and covered by the flange of the hub cap, the opposite and inner edge of the bead being inturned to provide a smooth finished edge terminating adjacent the wheel spokes, the tendency of the ring to contract providing the sole means of supporting the same on the hub.

2. A device of the character described for use in conjunction with a hub of a spoked vehicle wheel hub having an outer inturned flange and a central aperture and a hub cap insertible therein, said hub having truncated conical portion of greater diameter at the outer end of the hub, comprising a split metal ring of non-corrosive material formed with a truncated conical portion for encircling the corresponding portion of the hub and having a flange at its outer end covering the inturned flange of the hub between the cap and the said hub flange and its inner portion encircling the hub and terminating adjacent the wheel spokes with an inturned portion to provide a rounded terminal edge.

3. A device of the character described for use in conjunction with a hub of a spoked vehicle wheel hub having an outer inturned flange and a central aperture and a hub cap insertible therein, said hub having a truncated conical portion of greater diameter at the outer end of the hub, comprising a split metal ring of non-corrosive material formed with a truncated conical portion for encircling the corresponding portion of the hub and having a flange at its outer end covering the inturned flange of the hub between the cap and the said hub flange and its inner portion encircling the hub and terminating at the wheel spokes.

4. An ornamental bead for the hub of a vehicle wheel, having a rim and means between the hub and rim for sustaining the rim in fixed relation with the hub and the hub having an internally flanged end of greater external diameter than the diameter thereof adjacent the point of connection of the said rim sustaining means therewith, comprising a split spring ring of non-corrosive sheet metal adapted to be sprung over the hub end with the ends of the ring at the split in practically abutting relation, said bead having a form corresponding to the form of the wheel hub and having an inturned flange at the outer end lying over the internal flange of the hub end, the opposite end of the bead terminating closely adjacent the said rim sustaining means, a hub cap having a portion insertible in the flanged end of the hub, and a peripheral flange engaging over the said inturned flange of the bead.

5. An ornamental bead for use with the hub of a vehicle wheel having a rim and means between the hub and the rim for sustaining the rim, said hub having an internally flanged end of greater external diameter than the diameter of the hub adjacent the point of connection of the rim sustaining means therewith and a peripherally flanged cap for insertion in the outer end of the hub, said bead comprising a split spring ring of non-corrosive sheet metal having a shape corresponding to the external shape of the hub and adapted to be sprung over the hub and with the ends of the ring at the split in practically abutting relationship, said bead further having an inturned flange at its outer end lying over the end of the hub and extending to between the flange of the cap and hub.

CLARENCE P. CHAMBERLIN.